United States Patent [19]

Moroto et al.

[11] Patent Number: 5,598,910

[45] Date of Patent: Feb. 4, 1997

[54] CLUTCH MECHANISM

[75] Inventors: Shuzo Moroto; Koji Sumiya; Mutsumi Kawamoto; Masao Kawai; Hideki Aruga, all of Aichi-ken; Toshihiro Shiimado, Tokyo, all of Japan

[73] Assignee: Kabushikikaisha Equos Research, Japan

[21] Appl. No.: 298,326

[22] Filed: Aug. 30, 1994

[30] Foreign Application Priority Data

Nov. 1, 1993 [JP] Japan .................................. 5-306978
Nov. 27, 1993 [JP] Japan .................................. 5-340299

[51] Int. Cl.⁶ .................................................. F16D 47/00
[52] U.S. Cl. ...................... 192/48.2; 192/48.4; 192/48.7; 192/70.14; 192/70.17; 192/91 R; 310/105
[58] Field of Search ................................ 192/48.7, 70.21, 192/48.2, 48.4, 52, 70.14, 84 PM, 91 R, 55.2, 55.61, 70.17, 85 V; 464/29; 310/100, 105

[56] References Cited

U.S. PATENT DOCUMENTS

| 2,204,499 | 6/1940 | Kattwinkel | 192/48.7 |
| 3,068,979 | 12/1962 | Arkus-Duntov | 192/70.17 X |

FOREIGN PATENT DOCUMENTS

| 1020242 | 11/1957 | Germany | 192/48.2 |
| 1096213 | 12/1960 | Germany | 192/84 PM |
| 58-184321 | 10/1983 | Japan . | |
| 61-156727 | 9/1986 | Japan . | |
| 62-89550 | 6/1987 | Japan . | |
| 1-158226 | 6/1989 | Japan . | |
| 3-104549 | 10/1991 | Japan . | |
| 3-277521 | 12/1991 | Japan . | |

*Primary Examiner*—Richard M. Lorence
*Attorney, Agent, or Firm*—Lorusso & Loud

[57] ABSTRACT

A clutch mechanism connecting and disconnecting an output shaft of an internal combustion engine and an input shaft of a transmission unit includes a first clutch assembly coupled to the input shaft of the transmission unit and a second clutch assembly coupled to an output shaft of the engine. A torque conduction member is provided between the first and second clutch assemblies for rotation relative to the two clutch assemblies. The torque conduction member has a first connecting surface for engaging the first clutch assembly and a second connecting surface for engaging the second clutch assembly. The contacting force at the first connecting surface is stronger than that at the second connecting surface, when a predetermined load is applied to the two connecting surfaces in succession.

21 Claims, 15 Drawing Sheets

F I G. 12
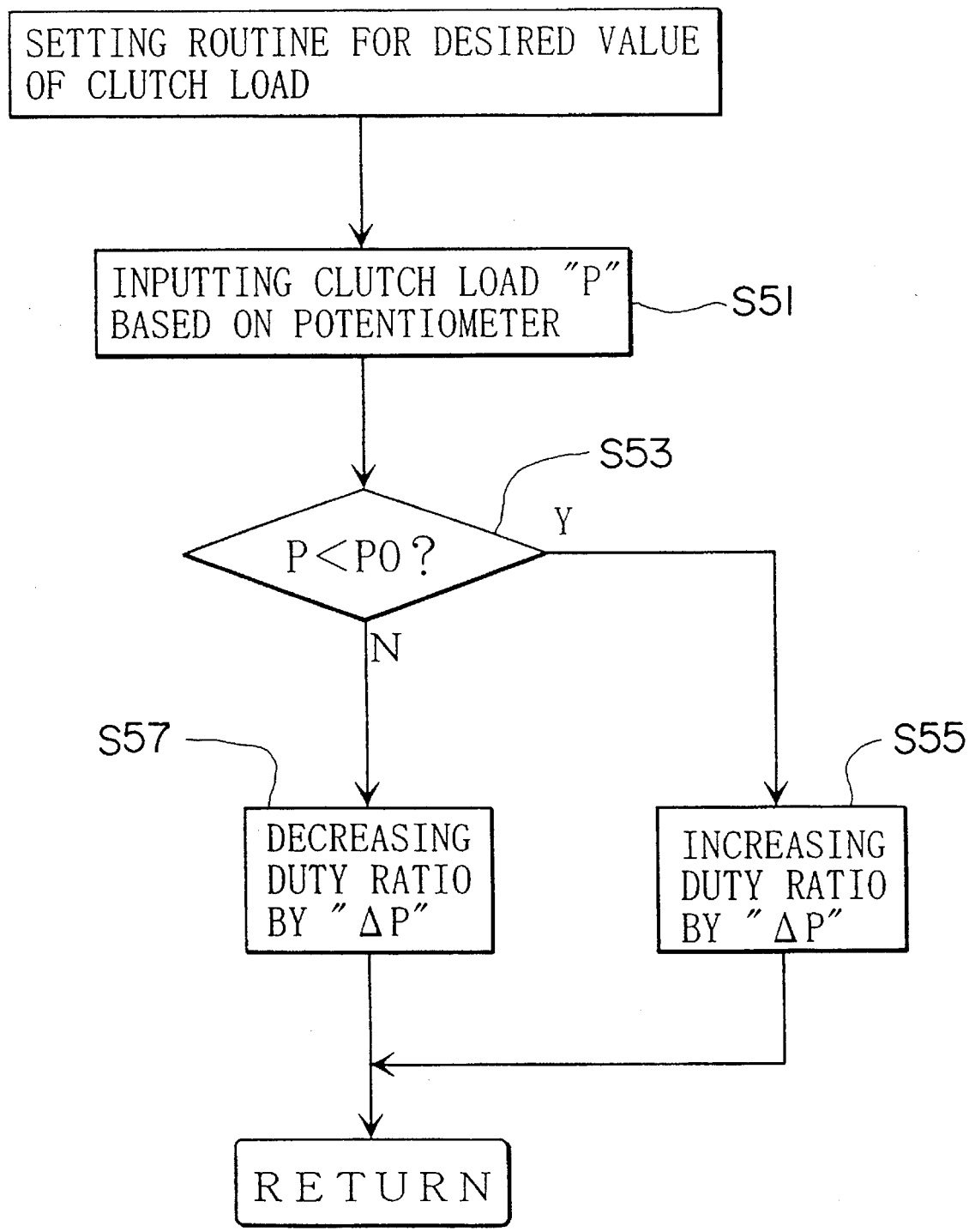

CLUTCH MECHANISM

BACKGROUND OF THE INVENTION

1. Field of the Invention

This invention relates to a clutch for a vehicle and, more particularly, to a clutch for selectively engaging an output shaft of an internal combustion engine (hereinafter referred to as "engine") with a transmission input shaft.

2. Description of the Related Art

In a vehicle employing a conventional manual transmission unit, a clutch is provided between the engine and the gearbox to control transfer of torque generated by the engine.

Such a conventional clutch system mainly consists of a dry, single friction disc, which is selectively either spaced from or in contact with an opposing, mating, member to deliver torque of the engine to the transmission unit.

As the friction disc has a high coefficient of friction, it is difficult to smoothly engage the opposing member and may produce a sudden interlocking between them.

Accordingly, a difference between the rotational speed of the engine and that of the transmission unit cannot be accommodated by such a conventional clutch mechanism.

In the interest of a smooth engagement, it is recommended that the friction disc be made of a low friction material. However, since a single low friction disc cannot deliver sufficient torque, plural discs are conventionally provided as disclosed in Japanese Patent Laid Open No. Sho 58-184321 and Hei 1-158226.

However, it is known that plural friction discs associated with the transmission unit greatly increase the inertia of the input shaft extending from the transmission unit, due to their heavy weight, and thereby impose a big load on the synchronizer system of the transmission unit, thus delaying synchronization of gears in the transmission unit.

It is an object of the present invention to provide a desirable clutch mechanism which will not impose a large load on the synchronizer system when connecting or disconnecting the output shaft of the engine in relation to the input shaft of the transmission unit, whereby the shafts can be interlocked smoothly without transmitting shock to the driver in the gear shifting operation.

SUMMARY OF THE INVENTION

Accordingly, the present invention provides a clutch mechanism for selectively connecting or disconnecting an output shaft of an internal combustion engine to/from an input shaft of a transmission unit. The clutch mechanism of the present invention includes a first clutch assembly coupled to the input shaft of the transmission unit; a second clutch assembly coupled to the output shaft extending from the engine; and a torque conduction member which is provided between the first and second clutch assemblies, which is rotatable relative to the two clutch assemblies and which has a first connecting surface for contact with the first clutch element assembly and a second connecting surface for contact with the second clutch assembly. The first connecting surface provides an engaging force substantially greater than that provided by the second connecting surface. The clutch mechanism further includes load application means for applying predetermined loads to the two connecting surfaces in succession.

The difference between engaging forces at the first and second connecting surfaces may be attributable to a difference as between the materials forming the first and second connecting surfaces, e.g. different coefficients of friction.

Either the torque conduction member or a member attached to the output shaft of the engine may include permanent magnets while the other would include an electrically conductive member opposing the permanent magnets to thereby produce a magnetic reaction between the permanent magnets and the conductive member.

The first clutch assembly should be provided with a damper system. The portion providing sliding contact between the second clutch assembly and the torque conduction member is, or is provided with, a highly magnetic permeable member.

In those embodiments where the connecting surfaces of the torque conduction member are frictional engagement surfaces, the relative respective engaging forces at the first and second connecting surfaces are determined, at least in part, by coefficients of friction of the first and second connecting surfaces. Thus, the coefficient of friction of the first connecting surface will be substantially higher than that of the second connecting surface. The respective engaging forces may be controlled by a resilient member, e.g. a diaphragm spring. The load application means is exemplified, in the first preferred embodiment described below, by a release cylinder assembly and a diaphragm spring, which is pivoted about a point by means of the release cylinder assembly to urge together the first and second connecting, e.g. frictional engagement, surfaces along a central axis of the input shaft of the transmission unit. The release cylinder assembly is understood to be connected to a hydraulic control circuit. The urging force effected by the diaphragm spring is controlled by the operating stroke of a vacuum operated device which is a component of the hydraulic control circuit.

The permanent magnets are ferrite magnets or samarium-cobalt magnets having high-temperature properties. The permanent magnets may be provided on the second clutch assembly. The permanent magnets may, alternatively, be provided on a flywheel secured to the output shaft of the engine. The electrically conductive member may be an aluminum clutch drum serving as the the torque conduction member and the clutch drum may be provided with a steel plate on its surface facing the flywheel.

The permanent magnets can be covered with a coating, e.g. ceramic, to serve as a friction plate for the second clutch element assembly secured to the output shaft of the engine.

The first and second clutch assemblies each have at least one friction plate.

BRIEF DESCRIPTION OF THE DRAWINGS

FIG. 12 is a clutch load setting routine which is a part of the control subroutine for the vacuum control valve;

Figure 1:
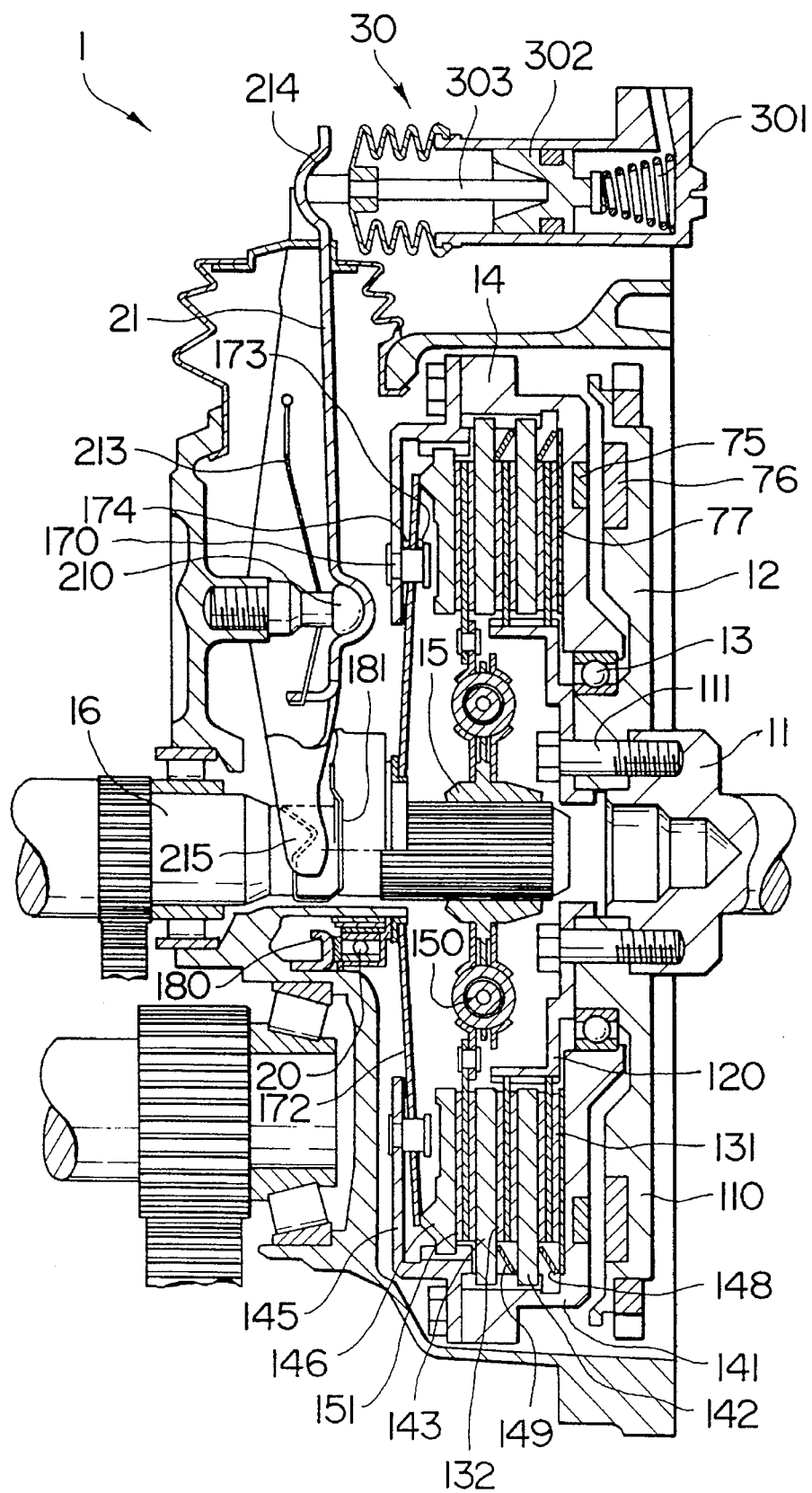
FIG. 1 is a sectional view depicting a clutch device according to the present invention.

Still other objects and advantages of the present invention will become readily apparent to those skilled in this art from the following detailed description, wherein only a few preferred embodiments of the invention are shown and described, by way of illustration. Of course, the invention may be in the form of other and different embodiments, and its details are capable of modifications in various obvious respects, all without departing from the invention. Accordingly, the drawing and description are to be regarded as illustrative in nature, and not as restrictive.

DETAILED DESCRIPTION OF TEE PREFERRED EMBODIMENT(S)

Certain terminology will be used in the following description for convenience in reference only and should not be considered limiting. The words "up", "down", "right" and "left" designate directions in the drawings to which reference is made. The words "in" and "out" refer to directions toward and away from, respectively, the geometric center of the device and designated parts thereof. Such terminology will include derivatives and words of similar import.

In the following description of various embodiments and modifications, the same reference numerals will be used to designate the same or similar components to avoid repetition and to simplify.

Figure 2:
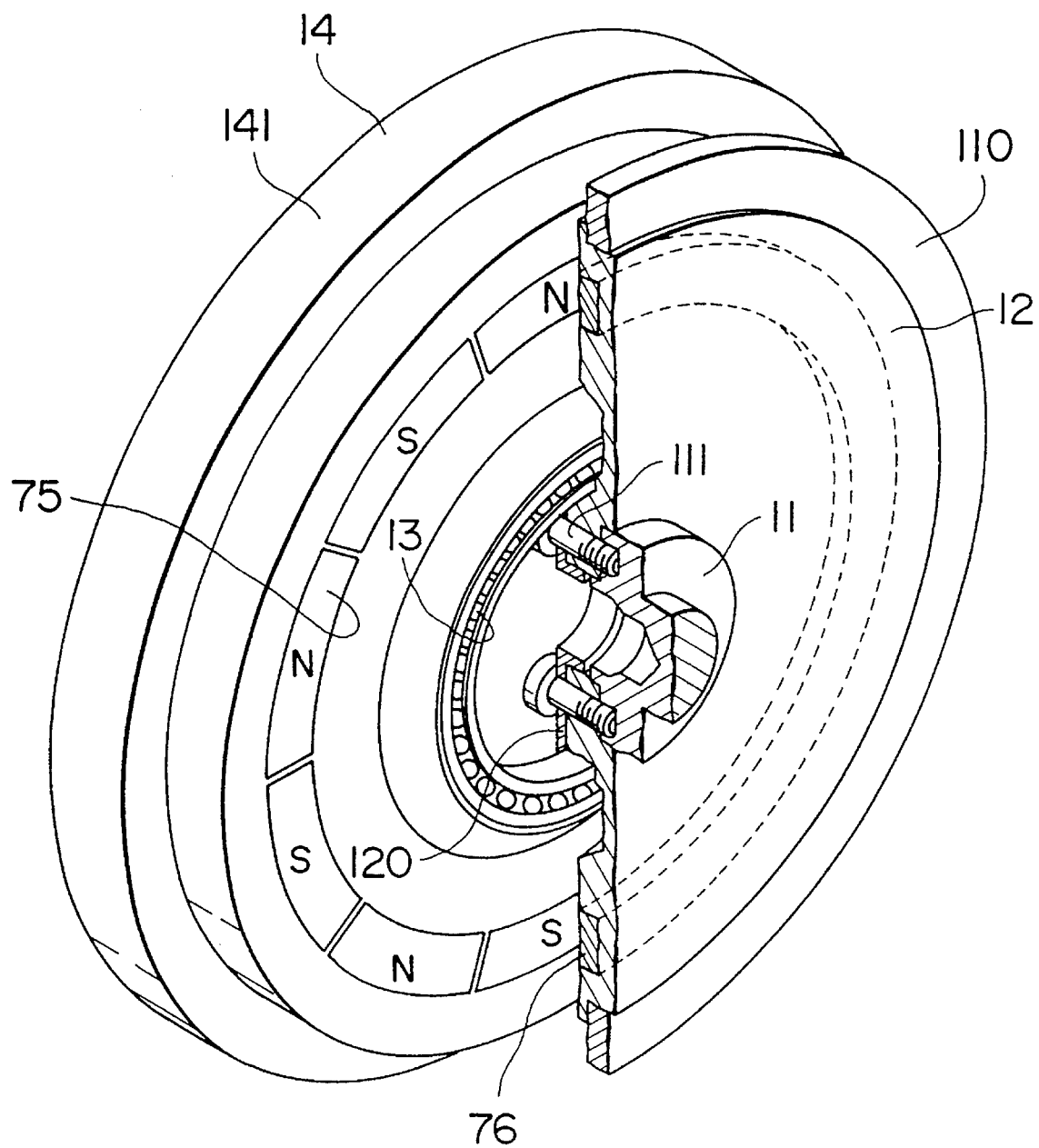
FIG. 2 is a perspective view showing the relative positioning of permanent magnets and an aluminum plate.
Figure 3:
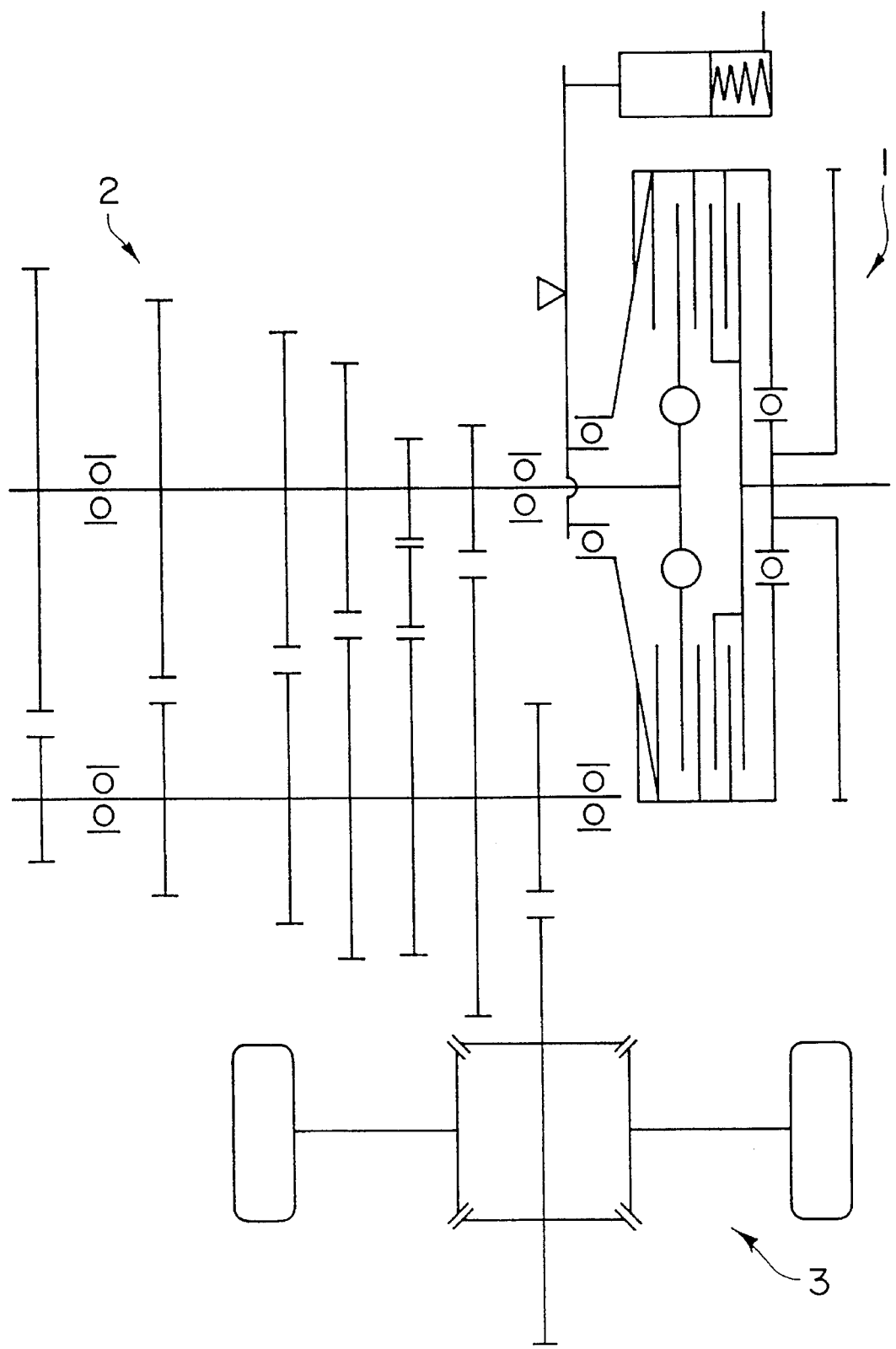
FIG. 3 is a schematic illustration of a power transmission unit in combination with the clutch mechanism of the present invention.

FIG. 1 is a sectional view of an embodiment of a clutch apparatus according to the present invention, FIG. 2 is a perspective view showing the position of permanent magnets 75 relative to an aluminum plate 76, arranged in an opposing relationship, and FIG. 3 is a schematic view of a power transmission assembly combined with a clutch mechanism according to the present invention.

FIG. 3 shows a power transmission unit 2 combined with a clutch mechanism in accordance with the present invention. The clutch mechanism 1 is adapted to connect and disconnect an input shaft 16 of the transmission unit 2 to/from an output shaft of an engine 11, responsive to an operation signal. As further shown in FIG. 3, the transmission unit 2 includes plural gear sets, each of which has a different gear ratio. The gear sets are mounted in mechanical alignment, on two parallel shafts, so as to mesh with one another under manual control. A differential gear unit 3 transfers torque from the transmission unit 2 to right and left driving wheels equally or differently.

Incidentally, the transmission unit 2 is, of course, provided with electric motors (not-shown) to move shift forks into predetermined positions to thereby select gears for forward and reverse.

Overall Structure of the Clutch Mechanism

The clutch mechanism 1 is shown in FIG. 1 as including a second clutch assembly 12 secured to an output shaft 11 of the engine by bolts 111, a torque conduction member 14 rotatable relative to the second clutch assembly 12 via a ball bearing 13, a first clutch assembly 15 slipped over a splined input shaft 16 extending from the transmission unit 2, a release fork 21 for operating the torque conduction member 14 via a release bearing 20, and a release cylinder 30 operating the release fork 21.

Second Clutch Assembly

The second clutch assembly 12 includes a clutch hub 120 and two friction plates 131, 132 splined to the clutch hub 120. The second clutch assembly 12 also includes a flywheel 110 secured thereto by means of bolts. The flywheel 110 is a disc of a ferromagnetic substance and is provided with an annular shaped aluminum plate 76 of a nonmagnetic, electrically conductive metal on its one side surface which faces the torque conduction member 14.

The friction plates 131, 132 are annular discs made of steel with low friction sheet members adhered to both surfaces thereof. The present invention utilizes plural friction plates because, as has been mentioned above, a single friction plate is not sufficient to transmit sufficient torque due to low friction.

First Clutch Assembly

The first clutch assembly 15 includes a friction plate 151 which is an annular metal plate with a high friction sheet member on both surfaces thereof and a damper 150. The friction coefficient of the "high friction sheet members" on plate 151 should be understood to be higher than that of the "low friction sheet members" utilized in the second clutch assembly 12 because the high friction sheet members are intended to provide a non-yielding interlocked state, rather than a sliding contact.

The damper 150 is provided to smooth fluctuation of the torque generated by the engine and includes three elements, the first being secured to the friction plate 151, the second being slipped over the splined input shaft 16 of the transmission unit 2 and the third being a damper spring arranged between the first and second elements. Accordingly, the torque from the engine is transmitted 15 to the friction plate 151, the damper 150 and the input shaft 16, in succession, while a spring in the damper 150 expands and contracts.

Adjustment of Engaging Force

The respective friction plates 151, 131, 132 are locked with the torque conduction member in a sequence dictated by their respective friction coefficients, by means of a diaphragm spring 172 which urges these three friction plates integrally in one direction. If necessary, the engaging force on the first clutch assembly 15 or second clutch assembly 12 can be adjusted by using return springs 148 and 149 having different elastic forces but, in the present invention, the return springs are not expected to be sufficiently strong to determine the engaging forces of the clutch assemblies.

The Torque Conduction Member

The torque conduction member 14 is defined by a drum member 141, the inner surface of which is splined for meshing with separate metal separate plates 142, 143. The clutch drum 141 is covered, at its open side, by a clutch cover 145 which has an interior, annular splined surface for receiving a pressure plate 146. As can be understood from the drawing, the return springs 148, 149 are respectively disposed (1) between a closed (right-hand) wall of the clutch drum 141 and the plate 142 and (2) intermediate the two separate plates 142, 143.

As can be seen from FIG. 2, the clutch drum 141 has a closed outer surface wall, facing the aluminum plate 76, which carries the permanent magnets 75, each having N and S poles, radially aligned and alternating with one another at a constant interval. Ferrite is recommended for the permanent magnet 75 but a samarium-cobalt magnet having high-temperature properties is also suitable.

At an inside surface of the closed wall of the clutch drum 141, there is provided a steel plate 77 as a highly magnetically permeable member. The steel plate 77 is a friction plate and forms a magnetic circuit capable of concentrating magnetic flux in cooperation with the aluminum plate 76.

The torque conduction member 14 is mounted for rotation relative to the second clutch assembly 12 via the ball bearing 13 in the above mentioned embodiment but can also be mounted on a cover case for the clutch mechanism 1 via a bearing, the details of which will be made clear in the description of a third embodiment, which follows.

Operation of the Clutch Mechanism

The clutch cover 145 has the dish-shaped diaphragm spring 172 fastened thereto with rivets 170 via wire rings 173, 174. The diaphragm spring 172 is supported at its radially innermost edge by the release bearing 20 and is arranged so that its outer, peripheral portion urges the pressure plate 146 responsive to movement of the release bearing 20 in a lateral (right and left on the drawing) direction.

The release fork 21 is provided with a return wire spring 213, so that when one end portion 214 of the release fork 21 is urged to the left in the drawing, the release fork 21 shifts its other end portion 215 in the opposite direction (to the right), about a supporting member 210 which serves as a fulcrum. It should be understood that when the one end portion 214 of the release fork 21 is returned (to the right in the drawing), the other end portion 215 moves to the left.

The release cylinder 30 includes a return spring 301, a piston 302 and a rod 303 extending from the piston 302. When the piston 302 is operated by oil pressure to reciprocate the rod 303, to which the one end portion 214 of the release fork 21 is connected, the other end 215 of the release fork 21 is moved as described above.

The release bearing 20 is arranged to slide reciprocally on the case, to the right and left in the drawing, and remains in contact with a positioning member 180 mounted in the case of the clutch mechanism 1 even when the one end portion 214 of the release fork 21 is not urged by the rod 303. The actual position of the positioning member 180 is selected so that the urging force on the pressure plate 146 imparted by the diaphragm spring 172 is sufficient to press together the second clutch assembly 12, the torque conduction member 14 and the first clutch assembly 15 so that torque of the output shaft 11 of the engine will be transferred to the input shaft 16 of the transmission unit 2.

Incidentally, the release bearing 20 is provided with an engagement member 181 for engaging the other end portion 215 of the release fork 21, whereby the inner peripheral portion of the diaphragm spring 172 is moved.

When the one end portion 214 of the release fork 21 is urged by the rod 303 to the left in the drawing, the other end portion 215 of the release fork 21 forces the inner peripheral portion of the diaphragm spring 172 to move to the right, via the release bearing 20, in opposition to the elastic force of the diaphragm spring 172.

The above-mentioned motion of the inner peripheral portion of the diaphragm spring 172 first decreases the urging force on the pressure plate 146 and then allows separation of an outer peripheral portion of the diaphragm spring 172 from the pressure plate 146. The smaller the urging force on the pressure plate 146, the weaker the engaging force on the low friction plates 131, 132 of the second clutch assembly 12 until the engagement of the second clutch assembly 12 is released, followed by release of the friction plate 151 of the first clutch assembly 15. Incidentally, the releasing motion of the friction plate 151 does not bring with it slip, as in the case of the low friction plates 131, 132, because of the high friction coefficient thereof. The separate plate 143 is moved by the return spring 148 via the separate plate 142 toward the pressure plate 146 as far as to contact the clutch cover. The release of the second clutch assembly 12, the torque conduction member 14 and the first clutch assembly 15 is thereby completed.

As the one end portion 214 of the release fork 21 is returned (to the right) by the rod 303, the other end portion 215 of the release fork 21 is moved to the left by means of the force of the diaphragm spring 172. The movement of the inner peripheral portion of the diaphragm spring 172 to the left leads the outer peripheral portion of the diaphragm spring 172 to increase the urging force on the pressure plate 146.

An increase of urging force on the pressure plate 146 by the diaphragm spring 172 leads to successive engagement of the friction plate 151, separate plate 143, friction plate 132, separate plate 142 and friction plate 131. In this movement, the return springs 148, 149 are compressed by the separate plates 143, 142.

Since the friction plate 151 of the first clutch assembly 15 has a high friction coefficient, it can quickly achieve interlock with the pressure plate 146 and the separate plate 143. On the other hand, the low friction plates 131, 132 of the second clutch element assembly 12 are adapted to engage with slipping. It is therefore possible to obtain a smooth and reliable engagement of the clutch mechanism through operation of the second clutch assembly 12, torque conduction member 14 and first clutch assembly 15.

As the urging force on the pressure plate 146 by the diaphragm spring 172 is increased, the pressure plate 146 urges together all of the friction plate 151, separate plate 143, friction plate 132, separate plate 142 and friction plate 131. In this process, the return springs 148, 149 are compressed via the separate plates 143, 142.

Because of the permanent magnets 75 installed in the closed wall of the clutch drum 141 and the aluminum plate 76 arranged in opposition to the magnets 75, so as to block magnetic flux issued from the magnets 75, an induction current is generated in the aluminum plate 76 wherein a magnetic reaction fluctuates in accordance with the difference between the rotary speed of the torque conduction member 14 and the rotary speed of the flywheel 110.

Figure 4:
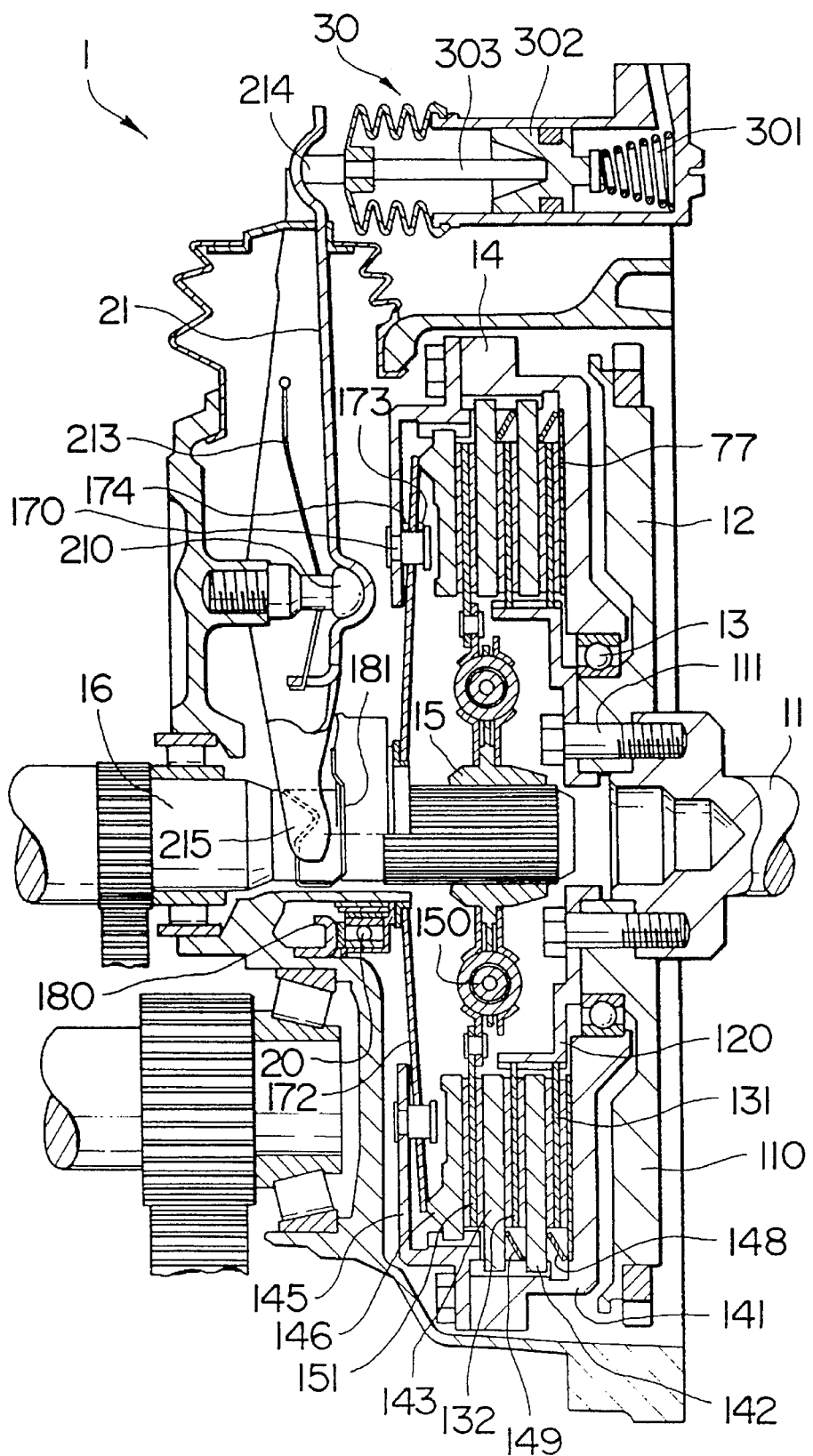
FIG. 4 is a sectional view of an embodiment of the present invention without permanent magnets.

In embodiments lacking permanent magnets, as depicted in FIG. 4, because the first clutch assembly 15 has the high friction plate 151, it securely engages the pressure plate 146 and the separate plate 143 without slipping. On the other hand, the low friction plates 131, 132 of the second clutch assembly 12 engage with slippage. Accordingly, the second clutch assembly 12, torque conduction 20 member 14 and first clutch assembly 15 become integrally connected.

Figure 5:
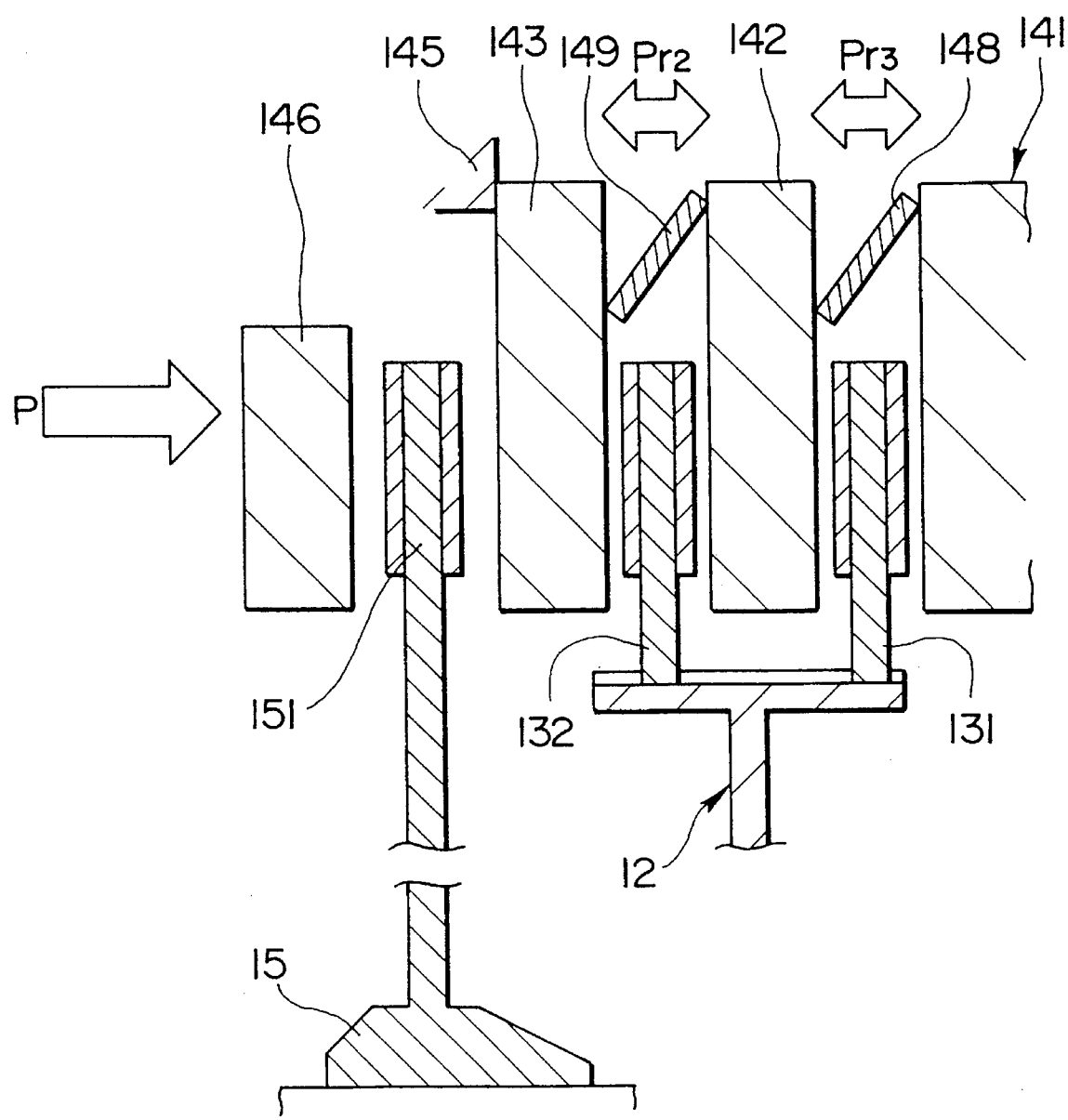
FIG. 5 is a schematic view depicting a first assembly of clutch elements which is included in the clutch device of FIG. 4.

FIGS. 4–5 show the relative positions of the torque conduction member 14 and the first and second clutch assemblies 15, 12. The pressure plate 146 is slipped over the splined portion of the torque conduction member 14. Also shown are the friction plate 151 of the first clutch assembly 15, the separate plate 143 slipped over the splined portion of the torque conduction member 14, the friction plate 132 of the second clutch assembly 12, the separate plate 142 slipped over the splined portion of the torque conduction member 14, the friction plate 131 of the second clutch assembly 12, and the closed wall of the clutch drum 141. Between the closed wall of the clutch drum 141 and the separate plate 142 and between two separate plates 142 and 143, there are provided the return springs 148 and 149, respectively.

As the urging force P from the diaphragm spring 172 on the pressure plate 146 increases, the pressure plate 146 urges together all of the friction plate 151, separate plate 143, friction plate 132, separate plate 142 and friction plate 131. In this state, the separate plates 143, 142 compress the return springs 148, 149. The spring constant $Pr_3$ of the return spring 148 is always larger than the spring constant $Pr_2$ of the return spring 149.

Start-Up From Standing—FIG. 1

In starting the vehicle, before the output shaft of the engine and the input shaft of the transmission unit are interlocked, that is before the first gear of the transmission unit is selected, it is supposed that the engine is in a constant idle.

If the vehicle stops moving, the friction plate 151 does not rotate and the torque conduction member 14 is constantly but slowly rotating relative to the flywheel 110 due to the above explained magnetic reaction.

When the urging force from the diaphragm spring 172 on the pressure plate 146 exceeds a certain amount, the pressure plate 146, friction plate 151 and separate plate 143 come into contact with one another whereby a certain torque determined by the magnetic reaction can be transmitted to the input shaft 16 of the transmission unit, which should become a dragging torque for a smooth start of the vehicle even on an upward incline.

As the urging force further increases, the friction plates 131, 132 and the clutch drum 141 begin to contact one another with slipping and then interlock. Accordingly, the torque generated by the engine is effectively delivered to the input shaft 16 of the transmission unit 2.

Gear-Shifting

It is generally known that the engine speed slows after an up-shift and rises after a down-shift.

When shifting up, the connection between the torque conduction member 14 and the second clutch assembly 12 is released, and then the connection between the torque conduction member 14 and the first clutch assembly 15 is released. As the gear ratio of the transmission unit 2 is changed, the torque conduction member 14, the first clutch assembly 15 and the second clutch assembly 12 are again connected. Incidentally, the up-shift operation can be conducted smoothly because of the magnetic reaction between the associated permanent magnets 75 and aluminum plate 76.

For example, in a vehicle moving at a constant speed with an engine speed of 4000 revolutions per minute (hereinafter referred to as r.p.m.) before an up-shift, upon up-shifting, the engine speed would become about 2250 r.p.m. if there were no magnetic reaction; however, the torque conduction member 14 maintains the same engine speed at 4000 for the first clutch assembly 15 because of inertia thereof.

When up-shifting, the degree of opening of the accelerator is conventionally made small to slow down the engine speed and the rotational speed of the first clutch assembly 15 is controlled at 2250 r.p.m. by means of the transmission unit after the up-shift, so that the torque conduction member 14 remains at a relatively high rotary speed, detracting from the smoothness of the gear shift. But, in the present invention, due to the above-mentioned magnetic reaction, the rotary speed of the torque conduction member 14 also changes to a rotary speed corresponding to the engine speed after the gear shift, whereby an improved interlocking among the torque conduction member 14, first clutch assembly 15 and second clutch element assembly 12 in the up-shift is achieved. It should be understood that the same improved gear shift in a down-shift is obtained due to the magnetic interaction between the permanent magnets 75 and the aluminum plate 76.

Start From Standing—FIG. 4

As has been explained in connection with FIG. 1, in starting from standing, before the output shaft of the engine and the input shaft of the transmission unit are interlocked, i.e. in first gear, it is supposed that the engine is at a constant idle.

If the vehicle stops moving, the friction plate 151 does not rotate but, upon receiving the urging force P from the pressure plate 146, the pressure plate 146, friction plate 151 and separate plate 143 are integrally interlocked. Accordingly, the torque conduction member 14 and the input shaft 16 of the transmission unit 2 become ready to rotate integrally.

As the urging force P is further increased, both return springs 148, 149 are compressed, whereby the return spring 149, due to its smaller spring constant relative to the return spring 148, is first compressed to integrally connect the friction plate 132 and the separate plates 143, 142. Accordingly, since the friction plate 132 rotates constantly during idling of the engine, the torque conduction member 14 can receive torque generated by the engine with slippage.

When the return spring 148 having the larger spring constant is compressed, the friction plate 131 continuously rotating in conformity with the idle of the engine begins to connect with the separate plate 142 and the closed wall of the clutch drum 141. As has been explained above, the torque of the engine can then be transmitted to the torque conduction member 14 via the second clutch assembly and finally to the input shaft 16 of the transmission unit 2.

Gear-Shifting in FIG. 4

The interlocking of the input shaft 16 of the transmission unit and the output shaft 11 of the engine is almost the same as in the start from standing procedure described above.

When the connection between the input shaft 16 of the transmission unit and the output shaft 11 of the engine is released, the friction plate 131 of the second clutch assembly 12 is released first and then the friction plate 132 and the friction plate 151 are released in succession.

Explanation of the Hydraulic Control Circuit

Figure 6:
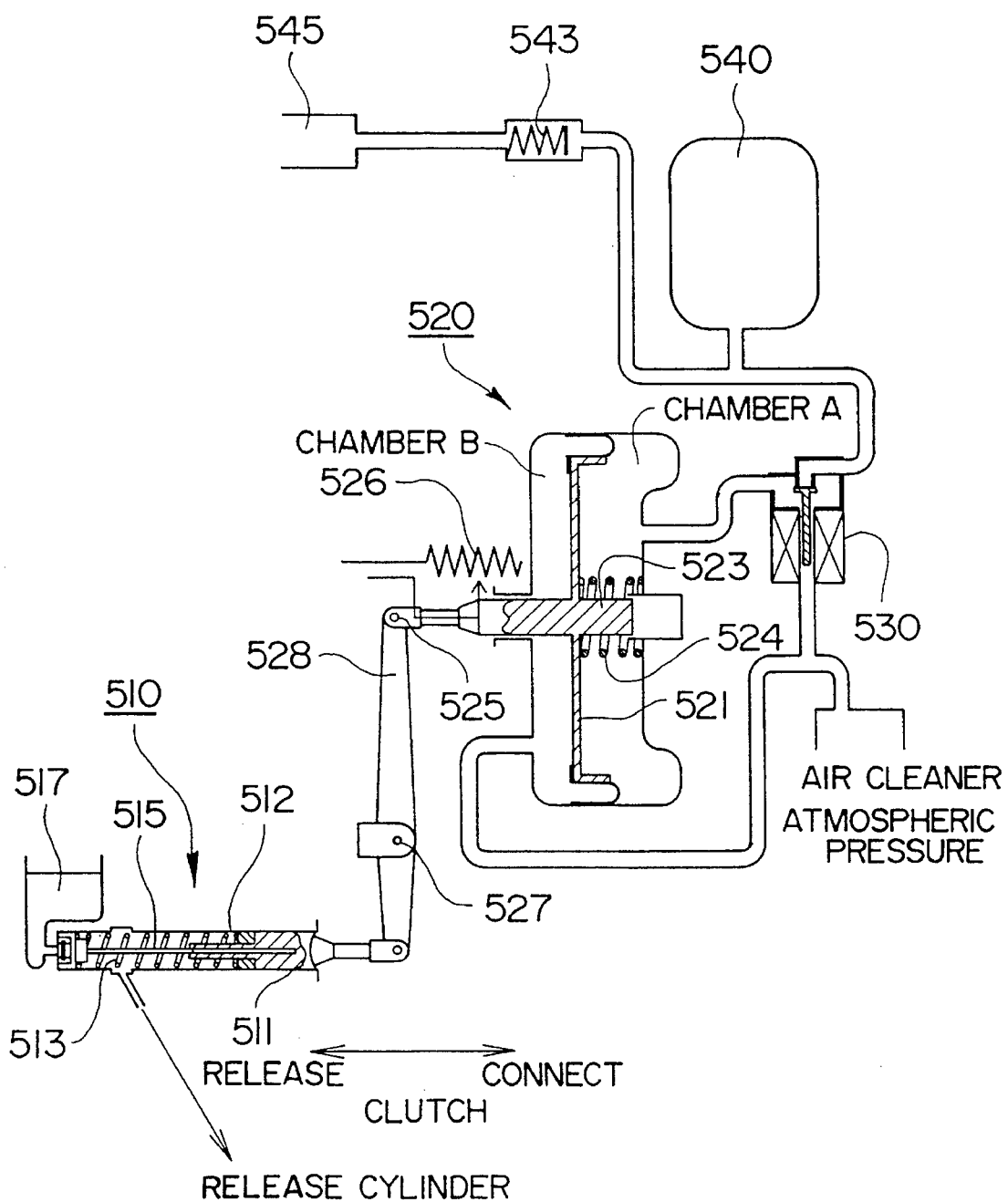
FIG. 6 is a schematic diagram of that portion of a hydraulic control circuit which controls a release cylinder operating the clutch mechanism of the embodiment of FIG. 1.

As shown in FIG. 6 the hydraulic control circuit includes a master cylinder 510 for feeding working fluid into the release cylinder 30, a reservoir 517 for supplying working fluid to master cylinder 510, a vacuum operated device 520 for driving the master cylinder 510, a vacuum control valve 530 for controlling the degree of negative pressure to the vacuum operated device 520, and a vacuum tank 540 for supplying the vacuum.

The master cylinder 510 has a piston 511 which reciprocates inside a cylinder 512 along a guide rod 515 extending in the longitudinal direction of the cylinder 512. Oil pressure is thereby fed from the cylinder 512 into the release cylinder 30 in accordance with displacement of piston 511.

The vacuum operated device 520 includes a piston 521 and a diaphragm dividing its interior into two sections (Chamber A and Chamber B). Device 520 further includes a rod 523 which is reciprocally driven by the piston 521, a return spring 524 coupled to the rod 523, and a potentiometer 526 for detecting the displacement of the rod 523. The detected displacement value of the rod 523 corresponds to the urging force applied to the pressure plate 146 by the diaphragm spring 172. The chamber A of the vacuum operated device 520 is connected to the vacuum tank 540 via the vacuum control valve 530.

The vacuum ("negative pressure") fed to the chamber A is, as depicted in FIG. 6, first received through an intake manifold 545, in the vacuum tank 540 via a one-way valve 543 and then finally fed to device 520 by means of the vacuum control valve 530 operated by a duty solenoid, under control of a control unit explained later. The other chamber B is open to the ambient atmosphere via an air cleaner.

The duty solenoid arranged in the vacuum control valve 530 is operated, based on control signals issued from the control unit, to control the interior pressure of the chamber A, whereby the rod 523 is moved to an extent determined by the pressure difference between the chambers A and B. The forward end 525 of rod 523 is connected to a forward end of the piston 511 in the master cylinder 510 via a connecting rod 528 which pivots about a point 527.

By lowering the pressure within the chamber A to below atmospheric pressure, thereby moving the rod 523 to the right in the drawing, the connecting rod 528 causes the piston 511 of the master cylinder 510 to move to the left to thereby feed the oil pressure into the release cylinder 30. As the pressure within the chamber A returns to atmospheric pressure, the piston 511 of the master cylinder 510 is returned by the reaction force of spring 513 in combination with the return spring 524 and the one end portion 214 of the release fork 21, whereby the oil pressure, previously fed to the release cylinder 30, is withdrawn into the master cylinder 510. As has been described above, the motion of the one end portion 214 of the release fork 21 can be controlled by operation of the release cylinder 30.

Explanation of Control Unit

Figure 7:
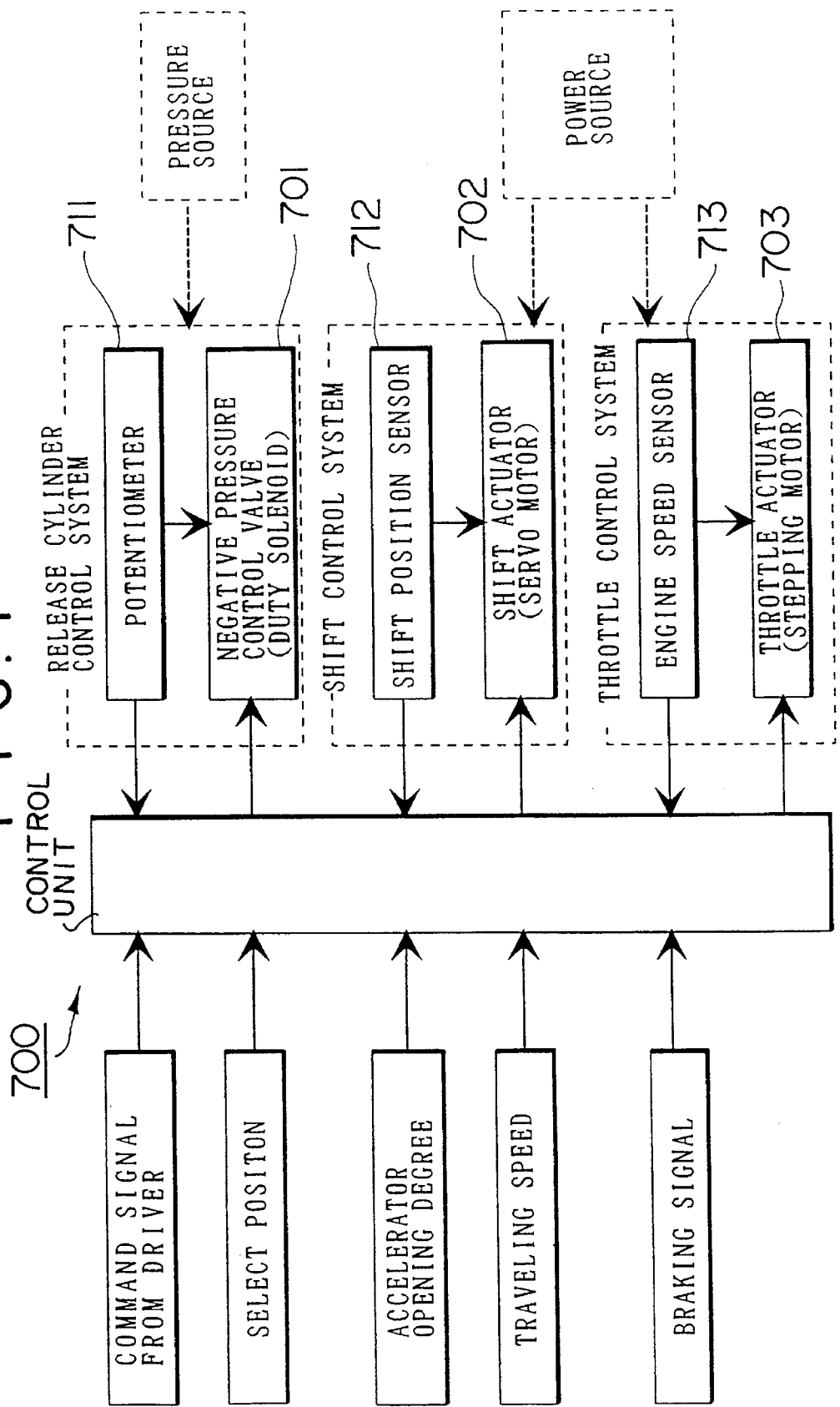
FIG. 7 is a block diagram depicting an input-output system of a control unit for the clutch mechanism.

FIG. 7 is a schematic view depicting an input-output system (hereinafter referred to as "I/O system") of the control unit 700.

The control unit 700 is mainly a computer having an input port adapted to receive detected signals showing an instant state of control and driving conditions. The detected signals are, for example, a control signal by a driver (e.g., "up-shift", "down-shift", "neutral", "forward" or "reverse"), a selected position signal showing the instant state of the gearing ("First gear", "Second gear" or the like), a signal for degree of accelerator opening indicating degree of depression of the accelerator, a traveling speed signal and a brake signal indicating operation of the brakes.

An output port of the control unit 700 outputs signals to actuators such as a duty solenoid 701 governing the vacuum control valve 530 which operates the release cylinder 30, a shift actuator 702 consisting of a servo motor moving the shift fork of the transmission unit 2, and a throttle actuator 703 consisting of a stepping motor for regulating the engine speed. The input port of the control unit 700 further receives detection signals from the potentiometer 711, a shift position sensor 712 and an engine speed sensor 713 for respectively conducting feed-back control of the vacuum control valve 530, the shift actuator 702 and the throttle actuator 703.

Control by Steering Wheel

Figure 8:
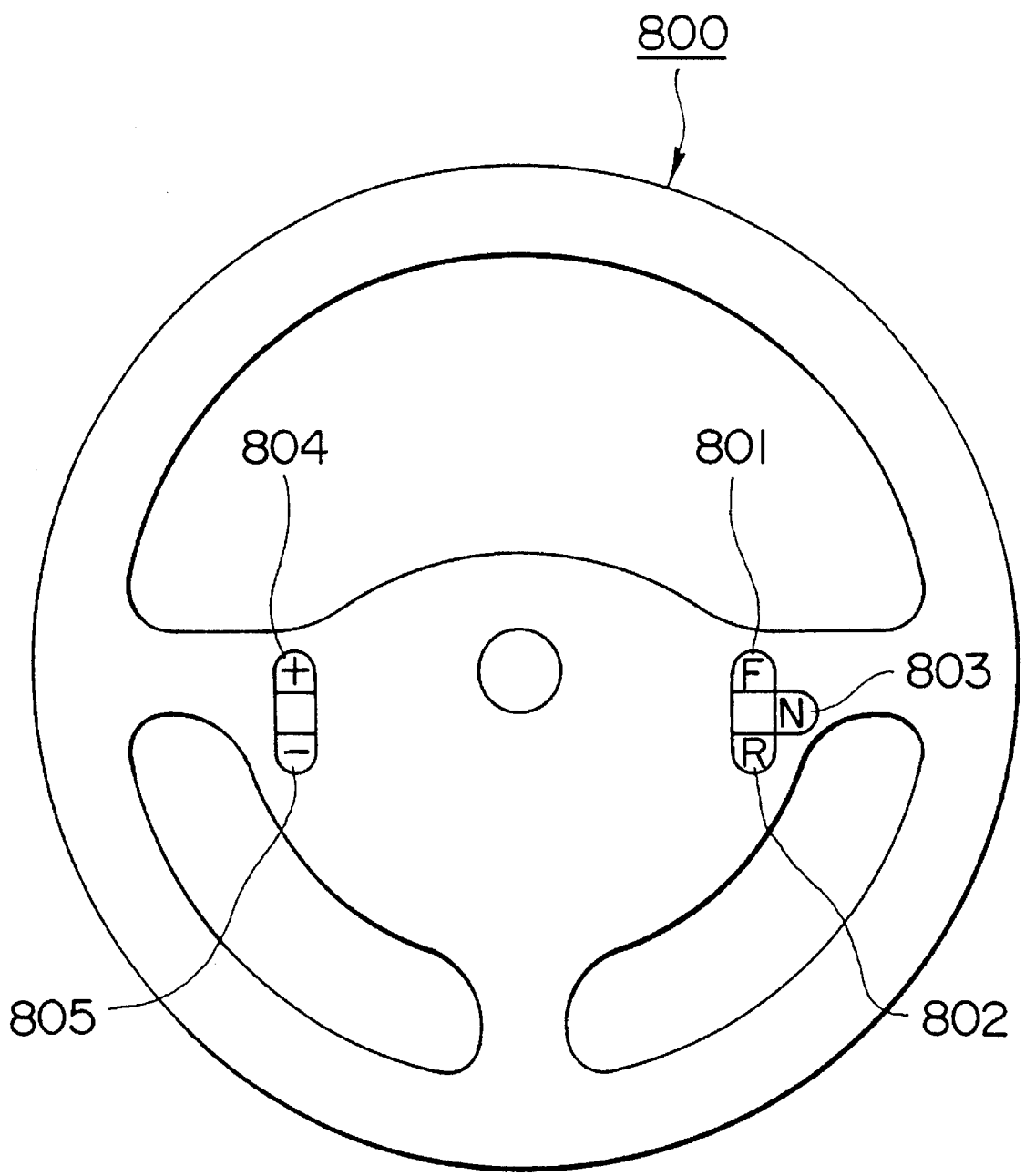
FIG. 8 is front view of a steering wheel, as seen by a driver.

Referring now to FIG. 8, there is shown a steering wheel 800 for use in a vehicle equipped with a clutch mechanism in accordance with the present invention. The steering wheel 800 is equipped with several push-buttons, for operation by the driver, at the right and left front portions thereof. On the right side of the steering wheel 800, is a first button 801 which is a marked "F" to place the vehicle in forward, a second button 802 marked "R" to place the vehicle in reverse, and a third button 803 marked "N" to place the transmission unit in a neutral state. On the left side is an up-shift button 804 marked "+" for commanding an up-shift and a down-shift button 805 marked "−" for commanding a down-shift.

Figure 9:
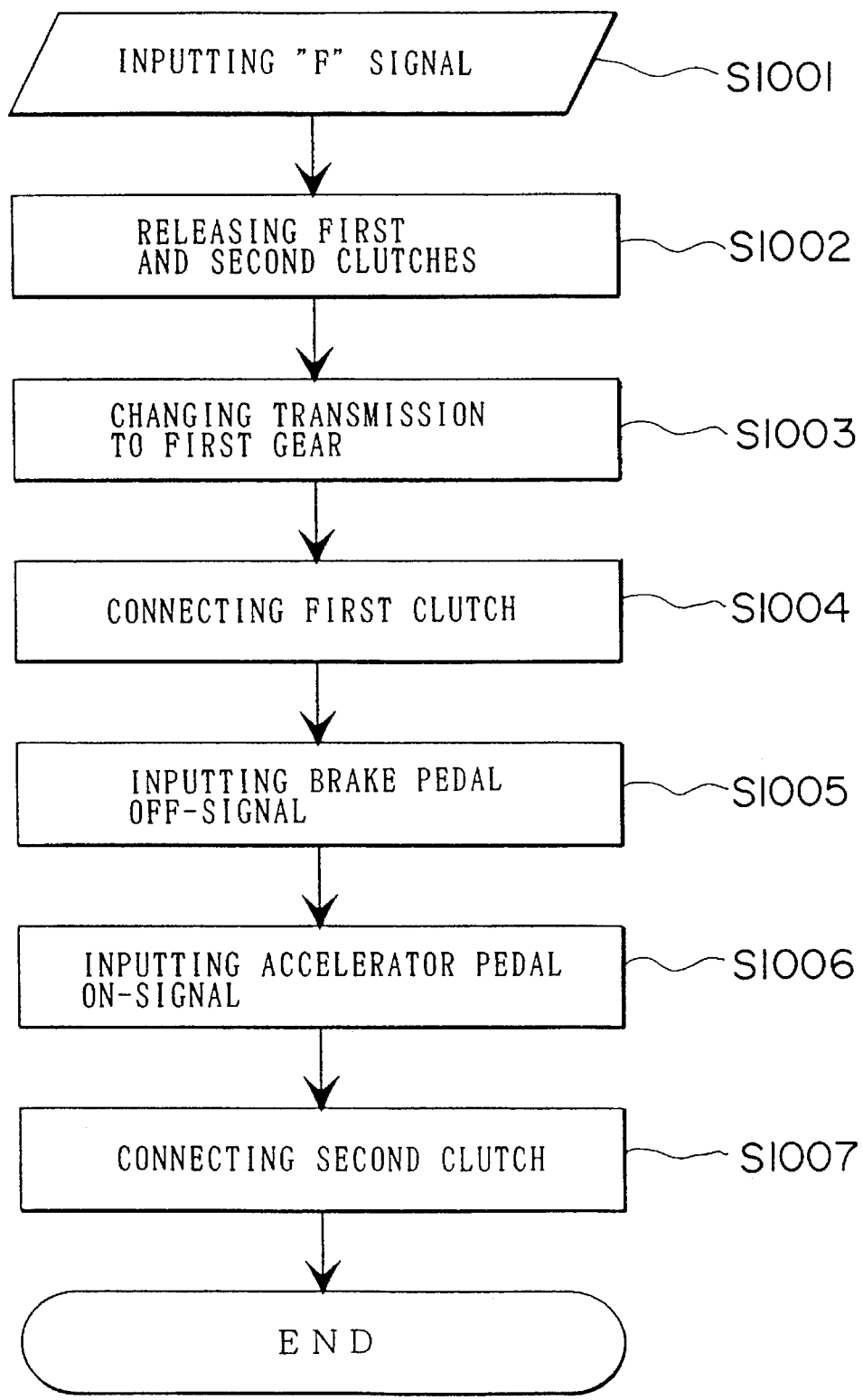
FIG. 9 is an example of a flow chart for operating several actuators responsive to a control signal for "forward" from the driver.
Figure 10:
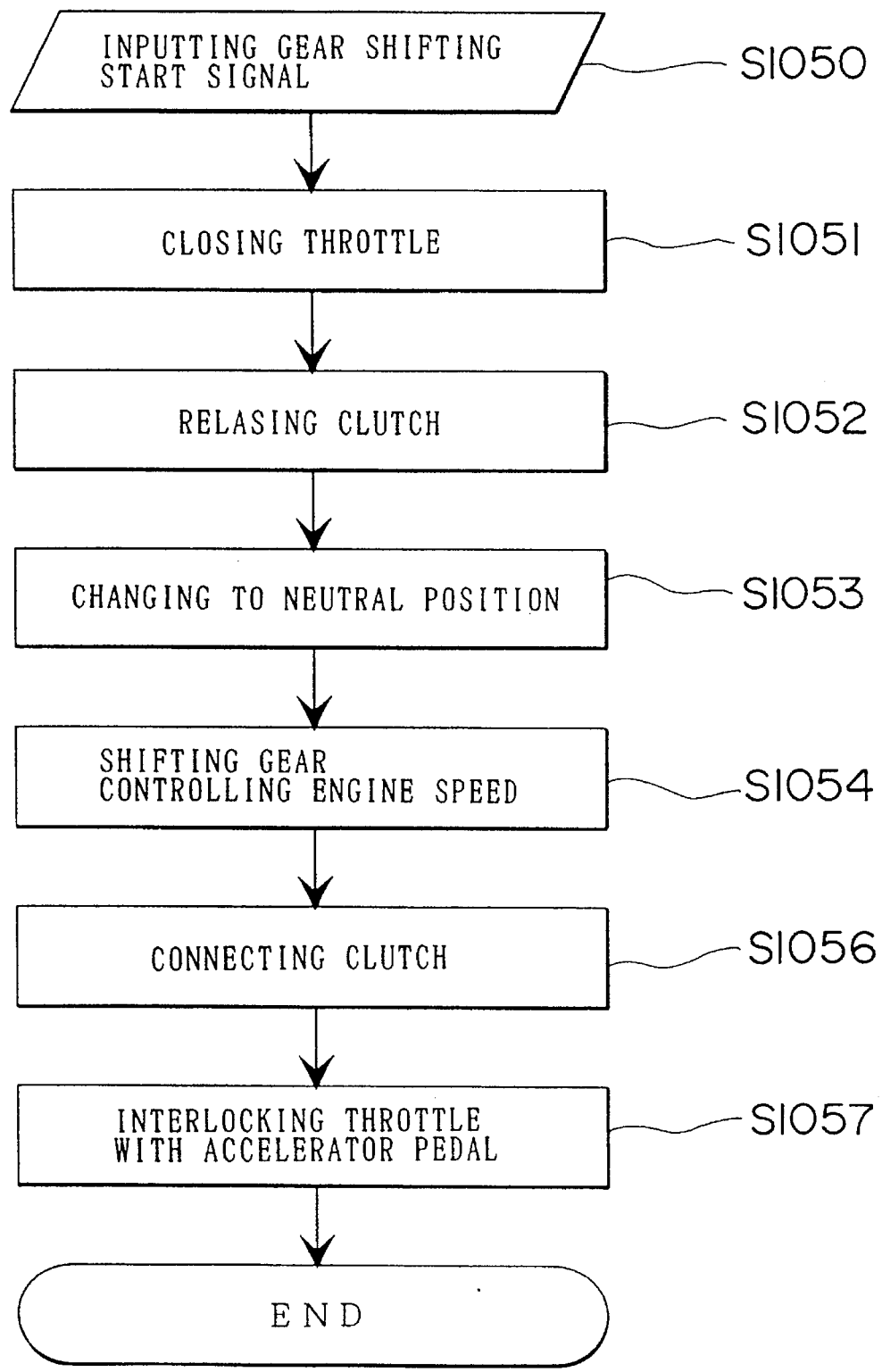
FIG. 10 is an example of a flow chart for operating several actuators responsive to a control signal for a gear-shift from the driver.

FIGS. 9–10 are charts showing how the control unit-700 controls several actuators upon receiving command signals from the driver.

When the button "F" 801 is pushed by the driver to place the vehicle in forward (S1001), the second clutch assembly 12 and the first clutch assembly 15 are released together by movement of the release fork 21 to reduce the urging force generated by the diaphragm spring 172, whereby the friction plate 151 is freed from the pressure plate 146 and separate plate 143 and the friction plates 131 and 132 of the second clutch assembly 12 are also freed with slipping.

To establish the first gear in the transmission unit 2 the shift fork is moved to a predetermined position by means of a servo motor (S1002) (not shown). The first clutch assembly 15 is engaged to a limited extent (S1003) after the first gear is selected. The first clutch assembly 15 can be engaged by feeding working fluid into the release cylinder 30 so that the diaphragm spring 172 urges the first clutch assembly 15 into engagement to a limited extent based on a voltage value detected by potentiometer 526 (S1004).

Responsive to detection of braking (S1005) and depression of the accelerator pedal (S1006), the working fluid pressure in the release cylinder 30 is adjusted to engage the second clutch assembly 12 with slipping (S1007).

As shown in FIG. 10, when the driver pushes the up-shift button 804 or down-shift button 805 (S1050), the second clutch assembly 12 and first clutch element assembly 15 are released (S1052), the same steps discussed above in connection FIG. 9, and the throttle is closed (S1051). Subsequently, the shift fork of the transmission unit 2 is moved by the servo motor (not shown) to the neutral state (S1053).

The shift fork is moved upon operation by the driver of either the up-shift button "+" 804 or down-shift button "−" 805 to thereby shift the gearing up or down, while controlling the engine speed (S1054). The engine speed control is carried out by the throttle actuator 703 which does not respond to the accelerator opening degree signal in this control scheme.

The second clutch assembly 12 and the first clutch assembly 15 are respectively engaged (S1054) when the first clutch element assembly 15 finishes connecting without slip while the second clutch assembly 12 is engaged with slipping (S1056). The throttle actuator 703 is retrieved in accordance with the accelerator opening degree signal (S1057).

Control Subroutine for Vacuum Control Valve

Figure 11:
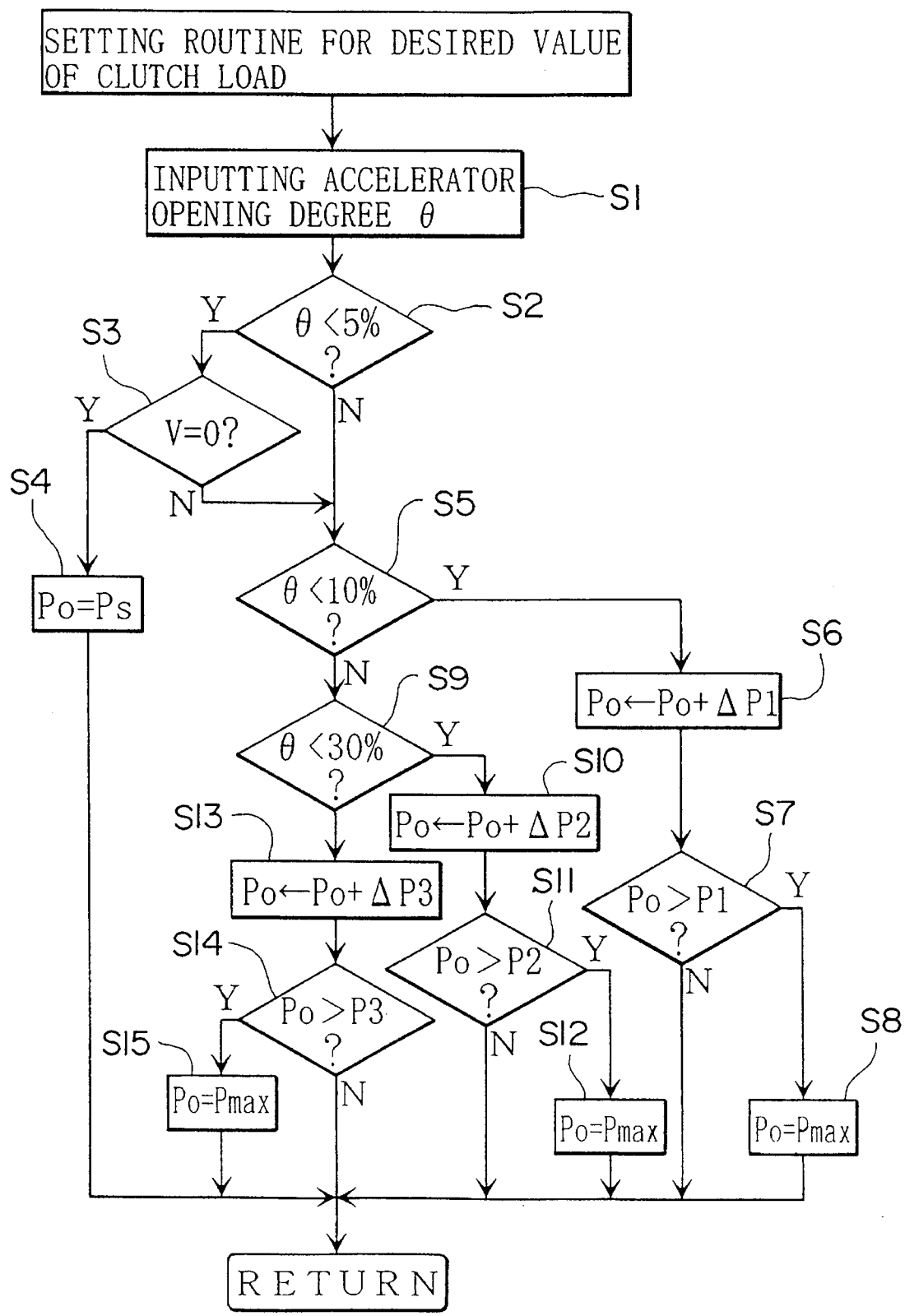
FIG. 11 is a routine for setting clutch load in a control subroutine of the control unit to control a vacuum control valve operating the release cylinder.
Figure 13:
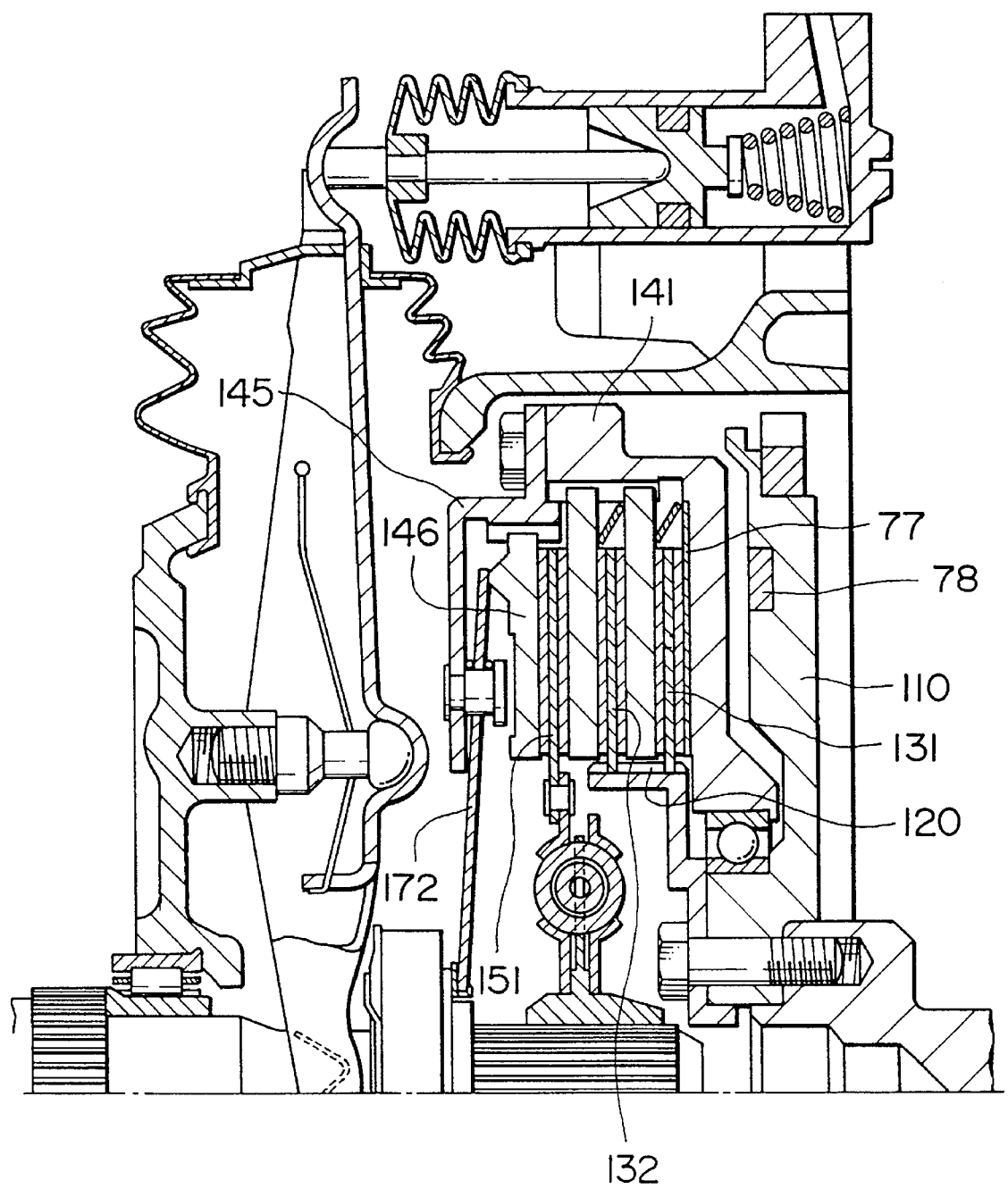
FIG. 13 is a partial cross-sectional view of a first modification of the embodiment depicted in FIG. 1.

Referring now to FIGS. 11–13, in the control unit 700, a control subroutine for the vacuum control valve 530 operating the release cylinder 30 will be described.

FIG. 11 is a routine for setting clutch load in the control subroutine of the control unit 700 to control the vacuum control valve 530 operating the release cylinder 30. Until receipt of a command for forward or a gear shift, the routine starts an interruption process which is repeated at regular intervals.

As can be understood from FIG. 11, the oil pressure is determined in accordance with a signal for degree $\Theta$ of accelerator opening from a sensor (S1) and, if the instant accelerator opening degree $\Theta$ is at or less than 5% of full accelerator opening and if the traveling speed V is not at 0 (zero), a desired clutch load Po is set as a setting value Ps (S2, S3, S4). The setting value Ps should be understood as a value for clutch load when the first clutch assembly 12 begins its engagement after the second clutch assembly 15 has completed its engagement.

When the detected traveling speed V is not at 0 (zero), it is determined if the instant degree $\Theta$ of accelerator opening is less than 10% of full accelerator opening (S5). When less than 10% (that is, the degree $\Theta$ of accelerator opening is more than 5% but less than 10%), a register value for the desired clutch load Po is set at Po+$\Delta$P1 (S6). The initial value of the register value for the desired clutch load Po is Ps, as mentioned above, that is a value corresponding to clutch load at the beginning of engagement of the first clutch assembly 12 after the completion of the engagement of the second clutch assembly 15.

When the desired clutch load Po reaches the value P1, corresponding to a degree $\Theta$ of accelerator opening more than 5% but less than 10%, the register value of the desired clutch load Po is set at Pmax, i.e. a maximum value (S7, S8). The maximum value Pmax represents an extreme state of clutch load wherein the first clutch assembly 12 and the second clutch assembly 15 are both completely engaged.

When the degree $\Theta$ of accelerator opening is more than 10% but less than 30%, the register value of the desired clutch load Po is set at Po+$\Delta$P2 (S9, S10). Upon the desired clutch load Po reaching the value P2 S11, corresponding to a degree $\Theta$ of accelerator opening more than 10% but less than 30%, the register value of the desired clutch load Po is set at Pmax for the maximum value (S12).

When the degree $\Theta$ of accelerator opening is more than 10% (S5) and more than 30% (S9), the register value of the desired clutch load P is set at $P_o+\Delta P3$ (S13). Upon the desired clutch load $P_o$ reaching the value P3 (S14), corresponding to a degree of accelerator opening more than 30%, the register value of the desired clutch load $P_o$ is set at $P_{MAX}$ for the maximum value (S15).

In the foregoing process, there is the relation:

P1<P2<P3

The above expression is represents an acceleration of increase of the desired clutch load Po in view of the fact that when the degree of accelerator opening is large, the driver may wish to quickly finish the engagement of the clutch assemblies.

If: P1<P2<P3, shock, due to application of the maximum clutch load before the before the completion of the connection between the first clutch assembly 12 and the torque conduction member 14, is avoided.

Referring now to FIG. 12, there is shown a clutch load setting routine, as a part of the control subroutine for the vacuum control valve 530 operating the release cylinder 30. It should be understood that the following load setting routine can be applied to any embodiment or modification of the present invention.

As in FIG. 11, until a command for forward or gear shift, the routine starts an interruption process which is repeated at regular intervals. In this routine, upon receiving the clutch load P from the potentiometer 526 (S51), the detected clutch load P is compared with the desired clutch load Po (S53).

If the clutch load P is found to be smaller than the desired clutch load Po, the duty ratio applied to the duty solenoid of the vacuum control valve 530 is increased by a predetermined degree (S55) so that the clutch load P can follow the desired clutch load Po.

On the other hand, if the clutch load P is found to be bigger than the desired clutch load Po, the duty ratio of the duty solenoid is reduced a predetermined degree to decrease the clutch load by $\Delta$P (S52).

In accordance with the present invention, as the urging force of the diaphragm spring 172 on the pressure plate 146 increases, the pressure plate 151 of the first clutch assembly 15, having a high friction coefficient, completes the interlocking with the torque conduction member 14 without slipping.

Subsequently, the pressure plates 131, 132 in the second clutch assembly 12, having a low coefficient of friction, engage with slipping. Since engagement of the friction plate 151 having a high coefficient of friction can be completed before the engagement of the friction plates 131, 132 having a low friction coefficient, shock upon engagement of the first clutch assembly 15 is prevented and smooth engagement is achieved overall due to engagement of the clutch assembly 12 with slippage.

As has been explained above, when the output shaft 11 of the engine and the input shaft 16 of transmission unit are interlocked, the torque conduction member 14, the first clutch assembly 15 and the second clutch assembly 12 can be engaged smoothly to one another, since the torque conduction member 14 is rotated by the flywheel 110 because of the magnetic reaction between the torque conduction member 14 and the flywheel 110, without transfer of inertia.

Even if the vehicle is not moving, the torque conduction member 14 rotates following the flywheel 110, so that if the urging force of the diaphragm spring 172 toward the pressure plate 146 is maintained to interlock the first clutch assembly 15 with the torque conduction member 14, torque drag is generated to prevent engine stopping when starting to move, even on an uphill incline.

Even if the second clutch assembly 12 has plural plates, which slip, the connection between the first clutch assembly 15 and the torque conduction member 14 can be insulated when shifting. The inertia of the input shaft extending from the transmission unit is limited to the first clutch assembly 15, so that a synchro-mesh of the transmission unit 2 does not have much load, allowing a quick gear change.

Because the second clutch assembly 12 is free of the problem of inertia, its shape, structure and materials can be selected in view of durability. Because the first clutch assembly 15 is free from any requirement for slippage, its shape, structure and materials can be selected to cope with the inertia problem and to provide durability.

FIRST MODIFICATION

FIG. 13 is a view of a first modification of the embodiment depicted in FIG. 1. This modification is characterized by a different arrangement of permanent magnets and corresponding aluminum plate. Specifically, the permanent magnets 78 are provided on the flywheel 110 made of steel so that they oppose the closed wall of the clutch drum 141, the permanent magnets consisting of plural N and S poles radially aligned alternately with one another at a spaced interval. The clutch drum 141 is made from aluminum, as in the foregoing embodiment and includes a steel plate 77 at the inside surface thereof.

Since the permanent magnets 78 are mounted in the flywheel 110 in this modification, they are not influenced by frictional heat generated in the friction plates 131, 132.

SECOND MODIFICATION

Figure 14:
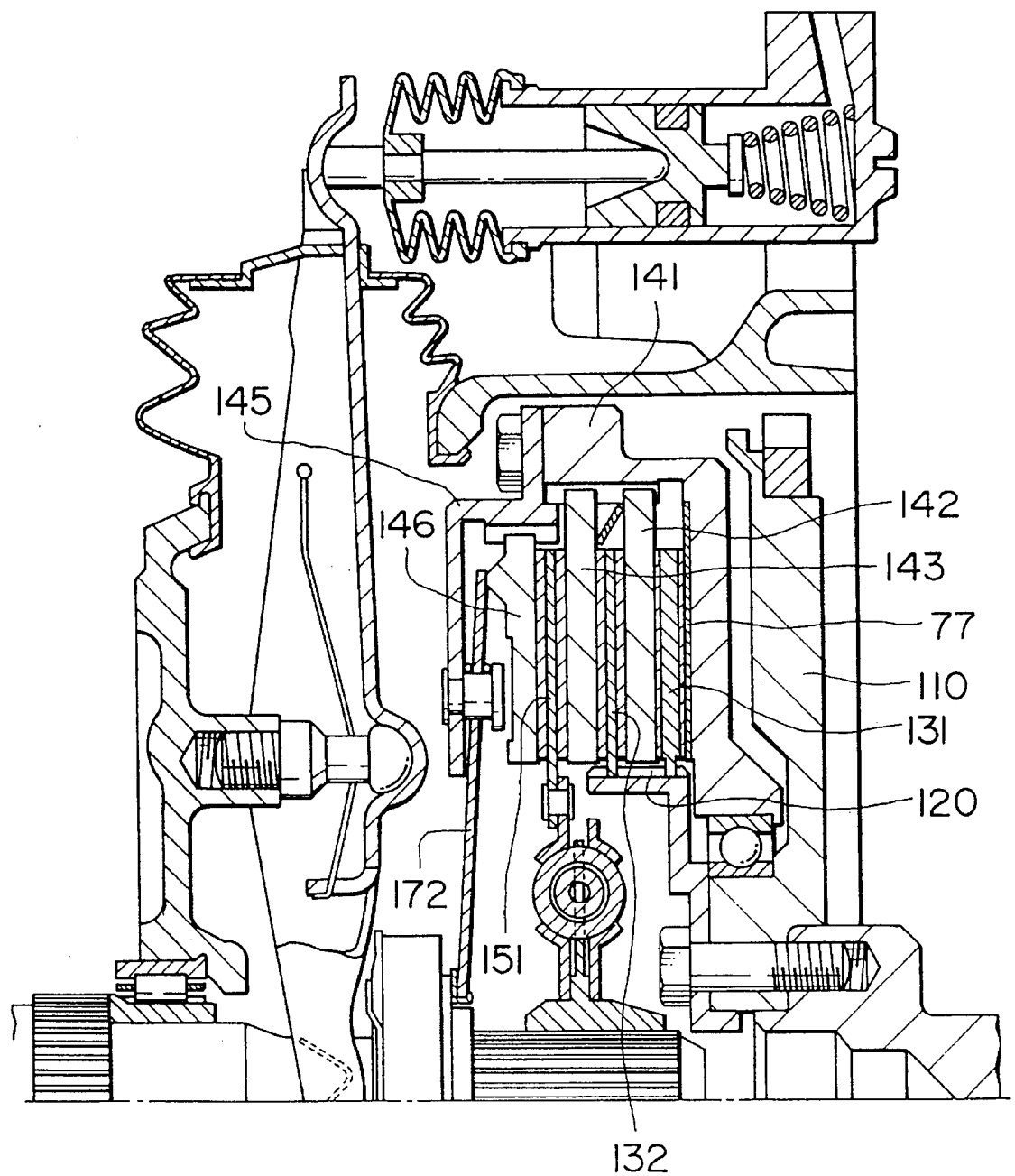
FIG. 14 is a partial cross-sectional view of a second modification of the embodiment depicted in FIG. 1.

A second modification of the embodiment of FIG. 1 is shown in FIG. 14. This modification is characterized by a different arrangement of the permanent magnets. Specifically, the friction plate 131 is made mainly of a permanent magnet which forms its core portion and is finished with a covering ceramic coating to serve as a friction member. In this modification, the separate plates 142, 143 are made from aluminum as well as the clutch drum 141. This modification is preferred for obtaining a strong magnet reaction since the aluminum plates are provided on both sides of the magnet.

THIRD MODIFICATION

Figure 15:
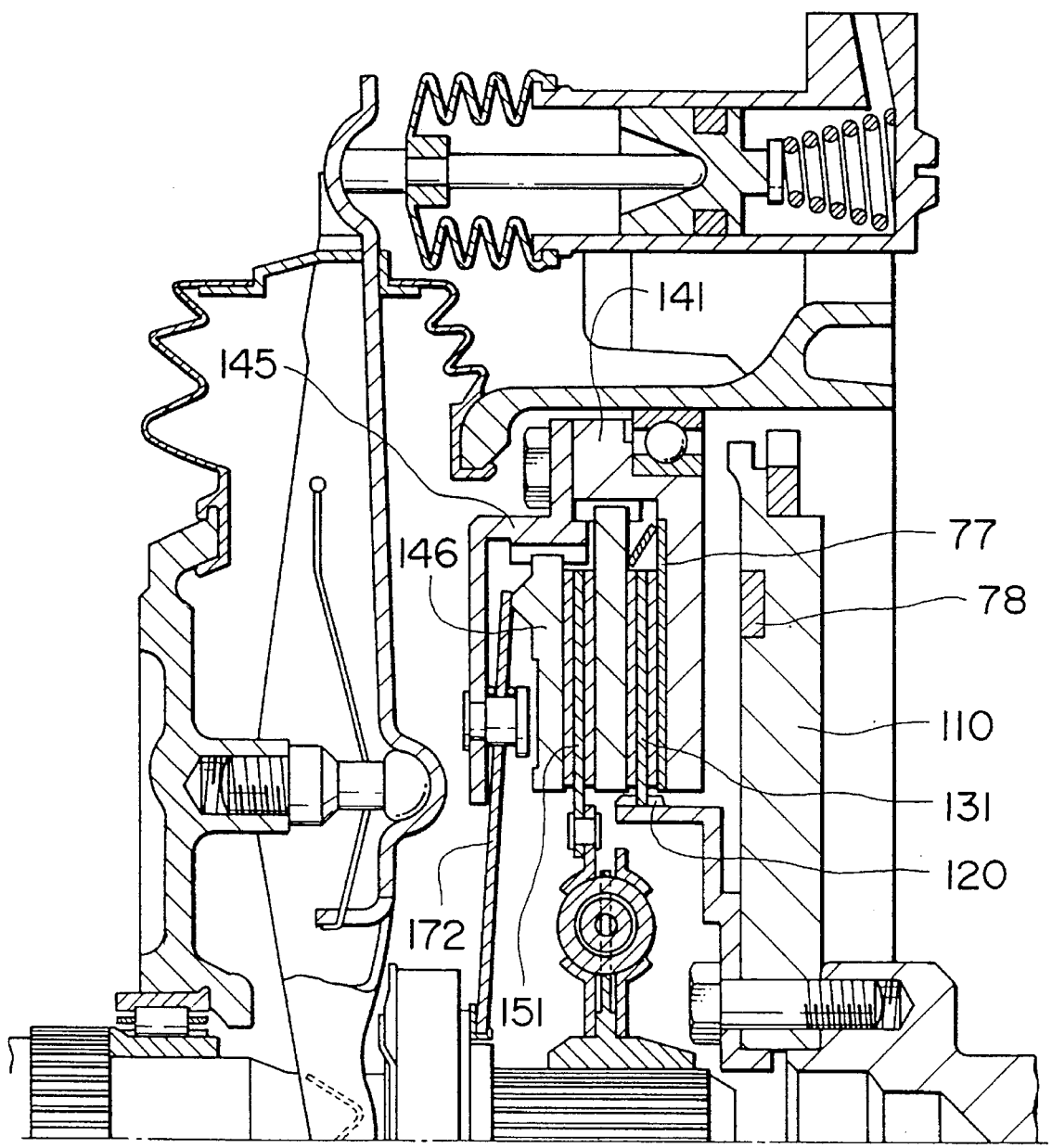
FIG. 15 is a partial cross-sectional view of a second modification of the embodiment depicted in FIG. 1.

A third modification of the embodiment shown in FIG. 1 is depicted in FIG. 15. Specifically, the second clutch assembly has a single friction plate and the magnetic reaction is stronger compared to that in the embodiment of FIG. 1. The torque conduction member 14 is supported by the case of the clutch mechanism 1 via a bearing. This modification operates as the functional equivalent of multiple friction plates.

In accordance with the above-described invention, when connecting and disconnecting the output shaft of the engine with the input shaft of the transmission unit, there is no load on the synchronizer system of the transmission unit and shock upon shifting the gearing is thereby avoided.

It is to be understood that the present invention is not intended to be limited to the above-described embodiments, and various changes may be made therein without departing from the spirit of the present invention. Such changes are intended to be included within the scope of the present invention.

What is claimed is:

1. A clutch mechanism for connecting and disconnecting an output shaft of an internal combustion engine and an input shaft of a transmission unit, said clutch mechanism comprising:

(a) a first clutch assembly adapted to be coupled to the input shaft of the transmission unit;

(b) a second clutch assembly adapted to be coupled to the output shaft of the engine;

(c) a torque conduction member between and rotatable relative to said first and second clutch assemblies, said torque conduction member having a first connecting surface for engaging said first clutch assembly and a second connecting surface for engaging said second clutch assembly, said first connecting surface providing a substantially higher engaging force than that provided by said second connecting surface;

(d) load application means for locking, in succession, first the torque conduction member to the first clutch assembly and then the torque conduction member to the second clutch assembly, said load application means including spring means for biasing and interlocking said torque conduction member and said first and second clutch assemblies and release means for releasing the biasing force of said spring means and thereby unlocking said torque conduction member from said first and second clutch assemblies; and (e) a magnetic drive member attached to the output shaft of the engine and permanent magnets mounted on one of said torques conduction member and said magnetic drive member and an electrically conductive member, mounted on the other of said torque conduction member and said magnetic drive member, opposing the permanent magnets, to create a magnetic force between the permanent magnets and the conductive member.

2. A clutch mechanism according to claim 1, wherein the first clutch assembly comprises a damper.

3. A clutch mechanism according to claim 1, wherein the second clutch assembly comprises a high magnetic permeability member for slipping contact with said second connecting surface.

4. A clutch mechanism according to claim 1, wherein the respective contacting forces at the first and second connecting surfaces depend upon coefficients of friction of the first and second connecting surfaces and wherein said first connecting surface has a substantially higher coefficient of friction than said second connecting surface.

5. A clutch mechanism according to claim 1, wherein said load application means comprises a resilient member.

6. A clutch mechanism according to claim 1, wherein said release means comprises a release cylinder assembly and said spring means is a diaphragm spring which is pivoted about a fixed point by means of said release cylinder assembly to urge the first and second connecting surfaces together along a central axis of the input shaft of the transmission unit.

7. A clutch mechanism according to claim 6, further comprising a hydraulic control circuit for the release cylinder assembly.

8. A clutch mechanism according to claim 7, wherein said hydraulic control circuit includes a vacuum operated device and wherein the urging force of the diaphragm spring is controlled by an operating stroke of said vacuum operated device.

9. A clutch mechanism according to claim 1, wherein the permanent magnets are ferrite magnets.

10. A clutch mechanism according to claim 1, wherein the permanent magnets are samarium-cobalt magnets.

11. A clutch mechanism according to claim 1, wherein the permanent magnets are provided on the second clutch assembly.

12. A clutch mechanism according to claim 1, wherein the permanent magnets are provided on a flywheel secured to the output shaft of the engine and wherein the electrically conductive member is an aluminum clutch drum defining said torque conduction member.

13. A clutch mechanism according to claim 12, wherein the clutch drum is provided with a steel plate on a surface thereof opposite the flywheel.

14. A clutch mechanism according to claim 1, wherein the permanent magnets are radially aligned on said magnetic drive member.

15. A clutch mechanism according to claim 14, wherein the permanent magnets are spaced and present alternating north and south poles facing said electrically conductive member.

16. A clutch mechanism according to claim 1, wherein the permanent magnets are covered with a coating which functions as a friction plate of said second clutch assembly.

17. A clutch mechanism according to claim 16, wherein the cover coating is ceramic.

18. A clutch mechanism according to claim 1, wherein the first and second clutch assemblies each have at least one friction plate.

19. A clutch mechanism according to claim 1, wherein said electrically conductive member is a nonmagnetic electrically conductive metal.

20. A clutch mechanism according to claim 1, wherein said electrically conductive member is composed of a nonmagnetic electrically conductive substance and a ferromagnetic substance, with the nonmagnetic electrically conductive substance arranged facing the permanent magnets.

21. A clutch mechanism for connecting and disconnecting an output shaft of an internal combustion engine and an input shaft of a transmission unit, said clutch mechanism comprising:

(a) a first clutch assembly adapted to be coupled to the output shaft of the engine;

(b) a second clutch assembly adapted to be coupled to the input shaft of the transmission unit;

(c) a torque conduction member which is between and rotatable relative to said first and second clutch assemblies, said torque conduction member having a first connecting surface for engaging said first clutch assembly and a second connecting surface for engaging said second clutch assembly, said first connecting surface providing a substantially higher engaging force than that provided by said second connecting surface; and (d) load application means for locking, in succession, first the torque conduction member to the first clutch assembly and then the torque conduction member to the second clutch assembly, said load application means including spring means for biasing and interlocking said torque conduction member and said first and second clutch assemblies and release means for releasing the biasing force of said spring means and thereby unlocking said torque conduction member from said first and second clutch assemblies.

* * * * *